United States Patent [19]

Chiba

[11] Patent Number: 5,179,047
[45] Date of Patent: Jan. 12, 1993

[54] HERMETIC SEALING GLASS COMPOSITION

[75] Inventor: Jiro Chiba, Yokohama, Japan

[73] Assignee: Asahi Glass Company Ltd., Tokyo, Japan

[21] Appl. No.: 674,141

[22] Filed: Mar. 25, 1991

[30] Foreign Application Priority Data

Mar. 27, 1990 [JP] Japan .................................. 2-75462

[51] Int. Cl.⁵ ..................... C03C 8/24; C03C 14/00; C03C 3/095; C03C 3/105
[52] U.S. Cl. ........................................ 501/15; 501/14; 501/18; 501/32; 501/62; 501/64; 501/76; 501/78
[58] Field of Search ................... 501/14, 15, 17, 18, 501/32, 62, 64, 76, 78

[56] References Cited

U.S. PATENT DOCUMENTS

| | | | |
|---|---|---|---|
| 3,461,078 | 8/1969 | Veres | 501/8 |
| 3,681,097 | 8/1972 | Beall et al. | 501/8 |
| 3,951,669 | 4/1976 | Malmewdier et al. | 501/10 |
| 4,006,028 | 2/1977 | Notziger | 501/15 |
| 4,238,704 | 12/1980 | Bonk et al. | 501/15 |
| 4,349,635 | 9/1982 | Davis et al. | 501/15 |
| 4,446,241 | 5/1984 | Francel et al. | 501/15 |
| 4,481,299 | 11/1984 | Tajima | 501/78 |
| 4,710,479 | 12/1987 | Yamanaka et al. | 501/15 |
| 4,774,208 | 9/1988 | Yamanaka et al. | 501/15 |

Primary Examiner—Mark L. Bell
Attorney, Agent, or Firm—Oblon, Spivak, McClelland, Maier & Neustadt

[57] ABSTRACT

A hermetic sealing glass composition comprising an inorganic component which consists essentially of from 60 to 100 wt % of a glass powder, from 0 to 30 wt % of a filler and from 0 to 10 wt % of a pigment, wherein said glass powder consists essentially of from 30 to 45 wt % of $SiO_2$, from 11 to 25 wt % of $Al_2O_3$, from 11 to 25 wt % of ZnO, from 11 to 25 wt % of $B_2O_3$, from 0.05 to 10 wt % of $ZrO_2$, from 0.1 to 10 wt % of at least one of $La_2O_3$, from 0.1 to 7 wt % of BaO, SrO, or CaO+MgO, from 0.1 to 7 wt % of at least one $Li_2O$, +$Na_2O$ or $K_2O$, from 0.1 to 5 wt % of at least one $CeO_2$, +$TiO_2$ or $SnO_2$, from 0 to 5 wt % of PbO and from 0 to 5 wt % of at least one metal oxide selected from the group consisting of oxides of Co, Ni, Cr, Mn, Fe and Cu.

2 Claims, No Drawings

HERMETIC SEALING GLASS COMPOSITION

BACKGROUND OF THE INVENTION

1. Field of the Invention

The present invention relates to a hermetic sealing glass composition for a metal having a thermal expansion coefficient of a range of from $40 \times 10^7$ to $60 \times 10^7/°$C. such as a kovar metal and a hermetic sealing process using the composition.

2. Discussion of Background

An Fe—Ni—Co alloy which is generally called kovar has a composition of 27-28% of Ni, 18-19% of Co and the rest of Fe and a thermal expansion coefficient of about $50 \times 10^7/°C$. It is used as a material for glass-sealed wires and packages.

Heretofore, both amorphous glass and crystalline glass are known for hermetic sealing of kovar. However, the amorphous glass has such a problem that it is insufficient in mechanical and thermal strength. As the crystalline glass, Japanese Examined Patent Publication No. 35045/1974 discloses a glass comprising from 9 to 21 mol % of $SiO_2$, from 14 to 36 mol % of $B_2O_3$, from 0 to 16 mol % of $Al_2O_3$, from 9 to 56 mol % of $CaO + MgO + SrO + BaO$ and from 9 to 51 mol % of $ZnO + CdO$. However, it has such problems that the chemical durability and the wetting property to kovar are poor and the yield is low.

SUMMARY OF THE INVENTION

It is an object of the present invention to provide a hermetic sealing glass composition having not only improved chemical durability, particularly water resistance and acid resistance, but also excellent thermal and mechanical strength, wetting property to a metal such as kovar and hermetic sealing property, and a process for hermetically sealing a metal using the composition.

The present invention has been made to solve the above-mentioned problems and provides a hermetic sealing glass composition comprising an inorganic component which consists essentially of from 60 to 100 wt % of a glass powder, from 0 to 30 wt % of a filler and from 0 to 10 wt % of a pigment, wherein said glass powder consists essentially of from 30 to 45 wt % of $SiO_2$, from 11 to 25 wt % of $Al_2O_3$, from 11 to 25 wt % of ZnO, from 11 to 25 wt % of $B_2O_3$, from 0.05 to 10 wt % of $ZrO_2$, from 0.1 to 10 wt % of $La_2O_3$, from 0.1 to 7 wt % of at least one of BaO, SrO, CaO or MgO, from 0.1 to 7 wt % of at least one of $Li_2O$, $Na_2O$ or $K_2O$, from 0.1 to 5 wt % of at least one of $CeO_2$, $TiO_2$ or $SnO_2$, from 0 to 5 wt % of PbO and from 0 to 5 wt % of at least one metal oxide selected from the group consisting of oxides of Co, Ni, Cr, Mn, Fe and Cu.

The present invention also provides a process for hermetically sealing a metal, which comprises preparing a hermetic sealing glass composition comprising an inorganic component which consists essentially of from 60 to 100 wt % of a glass powder, from 0 to 30 wt % of a filler and from 0 to 10 wt % of a pigment, wherein said glass powder consists essentially of from 30 to 45 wt % of $SiO_2$, from 11 to 25 wt % of $Al_2O_3$, from 11 to 25 wt % of ZnO, from 11 to 25 wt % of $B_2O_3$, from 0.05 to 10 wt % of $ZrO_2$, from 0.1 to 10 wt % of $La_2O_3$, from 0.1 to 7 wt % of at least one of BaO, SrO, CaO or MgO, from 0.1 to 7 wt % of at least one of $Li_2O$, $Na_2O$ or $K_2O$, from 0.1 to 5 wt % of at least one of $CeO_2$, $TiO_2$ or $SnO_2$, from 0 to 5 wt % of PbO and from 0 to 5 wt % of at least one metal oxide selected from the group consisting of oxides of Co, Ni, Cr, Mn, Fe and Cu, placing said hermetic sealing glass composition on a sealing portion of the metal, and heating said sealing portion to melt said glass powder and to thereby seal the metal.

DETAILED DESCRIPTION OF THE PREFERRED EMBODIMENTS

Now, the present invention will be described in detail. In the following description, "%" means "% by weight" unless otherwise specified.

In the glass powder of the present invention, the ranges of the components are decided as follows:

$SiO_2$: $SiO_2$ is a glass network former and essential for high reliability. If $SiO_2$ is less than 30%, the chemical durability tends to decrease, and if it exceeds 45%, the softening point of the glass tends to be too high whereby the fluidity will decrease and the hermetic sealing property will decrease, such being undesirable. It is preferably within a range of from 32 to 43%.

$Al_2O_3$: $Al_2O_3$ is essential as a main component for crystallization. If it is less than 11%, crystallization tends to be difficult and at the same time, the chemical stability tends to be poor. On the other hand, if it exceeds 25%, the softening point of the glass tends to be too high whereby the fluidity will be poor, such being undesirable. Preferably, it is within a range of from 12 to 24%.

ZnO: ZnO is essential as a main component for crystallization. If it is less than 11%, crystallization tends to be difficult. On the other hand, if it exceeds 25%, the chemical durability, particularly the acid resistance, will considerably decrease, such being undesirable. Preferably, it is within a range of from 12 to 23%.

$B_2O_3$: $B_2O_3$ is essential as a flux component for glass. If it is less than 11%, the softening point of the glass tends to be too high, such being undesirable. On the other hand, if it exceeds 25%, the chemical durability tends to be poor, such being undesirable. Preferably, it is within a range of from 12 to 23%.

$ZrO_2$: $ZrO_2$ is essential for the chemical stability and crystallization. If it is less than 0.05%, no adequate effects tend to be obtained, such being undesirable. If it exceeds 10%, vitrification tends to be difficult, such being undesirable. Preferably, it is within a range of from 0.1 to 8%.

$La_2O_3$: $La_2O_3$ is essential to improve the chemical stability. If it is less than 0.1%, the effects will be insufficient, such being undesirable. On the other hand, it exceeds 10%, vitrification tends to be difficult, such being undesirable. Preferably, it is within a range of from 0.5 to 8%.

BaO, CaO, MgO and SrO: These components are essential to adjust the thermal expansion coefficient and to improve the solubility of the glass. If they are less than 0.1%, the effects will be insufficient, such being undesirable. If they exceed 7%, the thermal expansion will be too large, such being undesirable. Preferably, they are within a range of from 0.5 to 6%.

$Li_2O$, $Na_2O$ and $K_2O$: These components are essential to control the chemical durability and the thermal expansion coefficient. If they are less than 0.1%, the effects will be insufficient and if they exceed 7%, the thermal expansion will be too large, such being undesirable. Preferably, it is within a range of from 0.5 to 6%.

CeO₂, TiO₂ and SnO₂: These components are essential to improve the chemical stability of the glass. If they are less than 0.1%, the effects will be insufficient, such being undesirable. If they exceed 5%, the softening point of the glass will be too high, such being undesirable. Preferably, they are within a range of from 0.5 to 4%.

PbO: PbO may be used in a trace amount as a flux component. However, if it exceeds 5%, the wetting to a kovar metal tends to decrease, such being undesirable. Preferably, it is within a range of from 0 to 3%.

Oxides of Co, Ni, Cr, Mn, Fe, and Cu: These components are used for coloring the sealing portion with various color tones. They may be used alone or in combination and introduced up to 5%.

The glass powder is maintained at from 900° C. to 1,000° C. for about 5 to 15 minutes, whereby $ZnO-Al_2O_3-SiO_2$ or $ZnO-Al_2O_3$ crystal will precipitate.

A filler or a pigment may be incorporated into the glass powder as the case requires. By incorporating the filler into the glass powder, the strength of the sealing portion can be improved and the thermal expansion coefficient can be controlled. If the content of the filler is too large, the fluidity and the hermetic sealing property tends to decrease. It is preferably not more than 30% relative to the inorganic component. It is more preferably within a range of from 5 to 30%.

As the filler, those having excellent strength and heat resistance are preferred. For example, alumina, zircon, cordierite, β-eucryptite, forsterite, α-quartz and stabilized zirconia may be mentioned.

Further, the particle size of the filler is preferably in a range of from 2 to 20 μm as the average particle size. If this particle size is too small, the moldability tends to decrease when the glass composition is molded into granules by using an organic binder. On the other hand, if this particle size is too large, the strength of the molded product will decrease when granules are molded to fit the sealing surface of the material to be sealed, whereby the workability for sealing will decrease, such being undesirable.

A pigment is used for coloring the sealing portion. If the content of the pigment exceeds 10% relative to the inorganic component, the hermetic sealing property of the sealing portion will decrease, such being undesirable.

The hermetic sealing glass composition of the present invention is suitable for hermetic sealing of a metal having a thermal expansion coefficient of from $40 \times 10^{-7}$ to $60 \times 10^{-7}/°$ C. In order to hermetically seal the metal, the hermetic sealing glass composition and an organic binder are kneaded and placed on the sealing portion of the metal. Then, the sealing portion is heated at from 900° to 1,000° C. in a non-oxidizing atmosphere, whereby the organic binder is removed and the glass powder is melted and crystallized to thereby seal the metal. As the organic binder, acrylate resins may be exemplified.

As another process, a mixture of the hermetic sealing glass composition and an organic binder is molded into granules and calcined at from 700° to 800° C. to remove the organic binder and to obtain a calcined product. Then, the calcined product is placed on the sealing portion of the metal and the sealing portion is heated at from 900° to 1,000° C. in a non-oxidizing atmosphere, whereby the glass is melted and crystallized to seal the metal. Since the organic binder is preliminarily removed, the second process is particularly preferable to seal a package for semiconductor which may be deteriorated by the organic binder.

EXAMPLES 1-8 and COMPARATIVE EXAMPLES 1 and 2

Starting materials were mixed to obtain a desired composition as identified in Table 1. In a platinum crucible, this mixture was heated and uniformly melted at a temperature of from 1,400 to 1,550° C. for 2 to 4 hours to conduct vitrification. Then, the melted glass was pulverized by water or pulverized into flakes, and further pulverized by a pulverizer such as ballmill to obtain a glass powder as identified in Table 1. To the glass powder, a filler or a pigment was added and mixed in an amount as identified in Table 1, and molded into a granule by using an organic binder such as an acrylate resin. Then, the granule was calcined at a temperature from 700° C. to 800° C. to remove the binder and thereby to obtain a calcined product.

The calcined product and a kovar metal were fixed by a jig made of e.g. carbon and subjected to firing at a temperature of from 900° to 1,000° C. in a non-oxidizing atmosphere followed by a package sealing step. The package thus obtained was evaluated with respect to the hermetic sealing property, falling off of the sealing glass by bending the kovar pin, thermal shock property and corrosion of the glass by a plating solution in a subsequent step. The results thus obtained are shown also in Table 1.

The results obtained in Comparative Examples are also shown in Table 1. It is evident from Table 1 that by using the composition of the present invention, hermetic sealing excellent in the hermetic sealing property, thermal shock property, mechanical strength and chemical resistance, can be attained.

TABLE 1

|  | Example 1 | Example 2 | Example 3 | Example 4 | Example 5 |
| --- | --- | --- | --- | --- | --- |
| 1. Glass powder |  |  |  |  |  |
| $SiO_2$ wt % | 33 | 38 | 43 | 38 | 38 |
| $Al_2O_3$ | 21 | 18 | 13 | 17 | 17 |
| ZnO | 20 | 15 | 13 | 15 | 15 |
| $B_2O_3$ | 13 | 15 | 21 | 13 | 13 |
| $ZrO_2$ | 8 | 4 | 0.5 | 4 | 4 |
| $LaO_3$ | 1 | 3 | 7 | 2 | 2 |
| BaO | 0 | 1 | 1.0 | 5 | 5 |
| CaO | 2 | 0 | 0 | 0 | 0 |
| SrO | 0 | 2 | 0 | 0 | 0 |
| MgO | 1 | 0 | 0.5 | 0 | 0 |
| $Li_2O$ | 0 | 0.5 | 0.5 | 0 | 0 |
| $Na_2O$ | 0.5 | 0 | 0 | 2 | 2 |
| $K_2O$ | 0 | 1 | 0 | 3 | 3 |
| $CeO_2$ | 0 | 1 | 0.5 | 0 | 0 |
| $TiO_2$ | 0 | 1 | 0 | 0 | 0 |

TABLE 1-continued

|  | | | | | |
|---|---|---|---|---|---|
| SnO$_2$ | 0.5 | 0.5 | 0 | 1 | 1 |
| 2. Filler | | | | | |
| Alumina | 0 | 3 | 0 | 4 wt % | 0 |
| Zirconia | 0 | 0 | 0 | 0 | 5 |
| Cordierite | 3 | 0 | 0 | 0 | 0 |
| Stabilized zirconia | 0 | 0 | 5 | 0 | 0 |
| 3. Heat resistant pigment | 1.5 | 0 | 0 | 1.0 | 0.5 |
| 4. Physical properties | | | | | |
| Hermetic sealing property | ◯ | ◯ | ◯ | ◯ | ◯ |
| Thermal shock property | ◯ | ◯ | ◯ | ◯ | ◯ |
| Mechanical strength | ◯ | ◯ | ◯ | ◯ | ◯ |
| Chemical resistance | ◯ | ◯ | ◯ | ◯ | ◯ |
| Thermal expansion coefficient | 56 × 10$^{-7}$/°C. | 54 × 10$^{-7}$/°C. | 58 × 10$^{-7}$/°C. | 57 × 10$^{-7}$/°C. | 52 × 10$^{-7}$/°C. |
| Glass transition temperature | 620° C. | 600 | 590 | 610 | 610 |
| Glass softening temperature | 810° C. | 790 | 770 | 790 | 795 |
| Crystallization temperature | 915° C. | 930 | 940 | 960 | 950 |

|  | Example 6 | Example 7 | Example 8 | Comparative Example 1 | Comparative Example 2 |
|---|---|---|---|---|---|
| 1. Glass powder | | | | | |
| SiO$_2$ wt % | 38 | 40 | 40 | 65 | 15 |
| Al$_2$O$_3$ | 17 | 15 | 15 | 9 | 2 |
| ZnO | 15 | 15 | 15 | 0 | 50 |
| B$_2$O$_3$ | 13 | 17 | 17 | 16 | 25 |
| ZrO$_2$ | 4 | 0.1 | 9 | 0 | 3 |
| LaO$_3$ | 2 | 9 | 0.5 | 0 | 0 |
| BaO | 5 | 1.9 | 1.4 | 2 | 0 |
| CaO | 0 | 0 | 0 | 1 | 5 |
| SrO | 0 | 0 | 0 | 0 | 0 |
| MgO | 0 | 0 | 0 | 0 | 0 |
| Li$_2$O | 0 | 0 | 0 | 0 | 0 |
| Na$_2$O | 2 | 1.5 | 0.5 | 4 | 0 |
| K$_2$O | 3 | 0 | 1 | 3 | 0 |
| CeO$_2$ | 0 | 0.5 | 0 | 0 | 0 |
| TiO$_2$ | 0 | 0 | 0 | 0 | 0 |
| SnO$_2$ | 1 | 0 | 0.5 | 0 | 0 |
| 2. Filler | | | | | |
| Alumina | 3 | 0 | 0 | 0 | 0 |
| Zirconia | 2 | 0 | 0 | 0 | 0 |
| Cordierite | 0 | 0 | 0 | 0 | 0 |
| Stabilized zirconia | 0 | 0 | 0 | 0 | 0 |
| 3. Heat resistant pigment | 0.5 | 0 | 0 | 0 | 0 |
| 4. Physical properties | | | | | |
| Hermetic sealing property | ◯ | ◯ | ◯ | ◯ | ◯ |
| Thermal shock property | ◯ | ◯ | ◯ | X | ◯ |
| Mechanical strength | ◯ | ◯ | ◯ | X | ◯ |
| Chemical resistance | ◯ | ◯ | ◯ | ◯ | X |
| Thermal expansion coefficient | 55 × 10$^{-7}$/°C. | 52 × 10$^{-7}$/°C. | 50 × 10$^{-7}$/°C. | 51 × 10$^{-7}$/°C. | 51 × 10$^{-7}$/°C. |
| Glass transition temperature | 610 | 620 | 625 | 520 | 580 |
| Glass softening temperature | 795 | 810 | 815 | 710 | 700 |
| Crystallization temperature | 945 | 950 | 960 | — | 760 |

The evaluation methods are as follows:

Hermetic sealing property: After frit sealing (heat treatment: 980° C., 10 minutes), the presence or absence of leak was determined by means of a helium leak tester. The case where the amount of leak was not higher than 1×10$^{-8}$ Torr.l/sec, was evaluated to be good (◯).

Thermal shock property: After frit sealing, a sample was maintained for 1 minute at −60° C. and then maintained for 1 minute at +150° C. This cycle was repeated 15 times. The case where cracking occurred, was evaluated to be poor (X), and the case where no cracking occurred, is evaluated to be good (◯).

Mechanical strength: The lead pin of the sealing portion was bended 3 times and examined by a micro scope (magnification: 80) whether or not cracking occurred in the sealing glass. The case where cracking (inclusive of falling off of glass) did not occur, was evaluated to be good (◯), and the case where cracking occurred, was evaluated to be poor (X).

Chemical resistance: A sample was immersed in a 10% HCl solution at 70° C. for 1 hour and examined whether or not there was any change on the surface. The case where there was no change, was evaluated to be good (◯), and the case where there was change, was evaluated to be poor (X).

Glass transition point, softening point, crystallization temperature: They were measured by means of differential thermal analysis (DTA).

Thermal expansion: An average value of thermal expansion as measured between 50 and 350° C. of a sample fired at 980° C. for 10 minutes.

According to the present invention, hermetic sealing of kovar can be conducted with high reliability, where excellent hermetic sealing properties and chemical resistance, and high strength as compared with conventional products, can be realized.

What is claimed is:

1. A hermetic sealing glass composition comprising an inorganic component which consists essentially of from 60 to 100 wt % of a glass powder, from 0 to 30 wt % of a filler and from 0 to 10 wt % of a pigment, wherein said glass powder consists essentially of from 30 to 45 wt % of $SiO_2$, from 11 to 25 wt % of $Al_2O_3$, from 11 to 25 wt % of ZnO, from 11 to 25 wt % of $B_2O_3$, from 0.05 to 10 wt % of $ZrO_2$, from 0.1 to 10 wt % of $La_2O_3$, from 0.1 to 7 wt % of at least one of BaO, SrO, CaO or MgO, from 0.1 to 7 wt % of at least one of $Li_2O$, $Na_2O$, or $K_2O$, from 0.1 to 5 wt % of at least one of $CeO_2$, $TiO_2$ or $SnO_2$, from 0 to 5 wt % of PbO and from 0 to 5 wt % of at least one metal oxide selected from the group consisting of oxides of Co, Ni, Cr, Mn, Fe and Cu.

2. The hermetic sealing glass composition according to claim 1, wherein the filler is at least one member selected from the group consisting of alumina, zircon, cordierite, forsterite, α-quartz, β-eucryptite and stabilized zirconia.

* * * * *